United States Patent [19]

Chiou

[11] Patent Number: 5,286,280
[45] Date of Patent: Feb. 15, 1994

[54] COMPOSITE GAS SEPARATION MEMBRANE HAVING A GUTTER LAYER COMPRISING A CROSSLINKED POLAR PHENYL-CONTAINING - ORGANOPOLYSILOXANE, AND METHOD FOR MAKING THE SAME -

[75] Inventor: Jeffrey J. Chiou, Irvine, Calif.

[73] Assignee: Hoechst Celanese Corp., Charlotte, N.C.

[21] Appl. No.: 999,449

[22] Filed: Dec. 31, 1992

[51] Int. Cl.$^5$ .................. B01D 53/22; B01D 71/64
[52] U.S. Cl. ........................................ 95/45; 95/47; 95/51; 95/53; 96/13; 427/412.1
[58] Field of Search ................. 55/16, 68, 158, 524, 55/DIG. 5; 427/407.1, 412.1, 417

[56] References Cited

U.S. PATENT DOCUMENTS

| | | | |
|---|---|---|---|
| Re. 30,351 | 7/1980 | Hoehn et al. ............................ | 55/16 |
| 3,526,588 | 9/1970 | Michaels et al. ................ | 210/500 X |
| 3,556,305 | 1/1971 | Shorr .................................... | 210/490 |
| 3,615,024 | 10/1971 | Michaels ............................. | 210/490 |
| 3,874,986 | 4/1975 | Browall et al. ...................... | 161/160 |
| 3,980,456 | 9/1976 | Browall ............................... | 55/158 |
| 4,192,842 | 3/1980 | Kimura et al. ....................... | 264/298 |
| 4,230,463 | 10/1980 | Henis et al. ......................... | 55/16 |
| 4,243,701 | 1/1981 | Riley et al. .......................... | 427/244 |
| 4,393,113 | 7/1983 | Sugie et al. .......................... | 428/220 |
| 4,406,673 | 9/1983 | Yamada et al. ...................... | 55/16 |
| 4,493,714 | 1/1985 | Ueda et al. ........................... | 55/16 |
| 4,575,385 | 3/1986 | Brooks et al. ....................... | 55/158 |
| 4,590,098 | 5/1986 | Kazuse et al. ....................... | 427/244 |
| 4,602,922 | 7/1986 | Cabasso et al. ..................... | 55/158 |
| 4,618,534 | 10/1986 | Iwama et al. ....................... | 428/316.6 |
| 4,644,046 | 2/1987 | Yamada .............................. | 528/28 |
| 4,705,540 | 11/1987 | Hayes ................................. | 55/16 |
| 4,717,394 | 1/1988 | Hayes ................................. | 55/16 |
| 4,728,346 | 3/1988 | Murphy .............................. | 55/158 |
| 4,746,333 | 5/1988 | Peinemann et al. ............... | 55/158 |
| 4,755,299 | 7/1988 | Brüschke ........................... | 55/16 X |
| 4,759,780 | 7/1988 | Yamada et al. .................... | 55/158 |
| 4,776,936 | 10/1988 | Smith et al. ........................ | 204/157.15 |
| 4,784,880 | 11/1988 | Coplan et al. ...................... | 427/245 |
| 4,838,900 | 6/1989 | Hayes ................................. | 55/16 |
| 4,877,528 | 10/1989 | Friesen et al. ..................... | 210/500.29 |
| 4,881,954 | 11/1989 | Bikson et al. ...................... | 55/16 |
| 4,933,082 | 6/1990 | Yamada et al. .................... | 55/158 X |
| 4,950,314 | 8/1990 | Yamada et al. .................... | 55/158 |
| 5,017,292 | 5/1991 | DiLeo et al. ....................... | 210/645 |
| 5,039,421 | 8/1991 | Linder et al. ...................... | 210/651 |
| 5,049,167 | 9/1991 | Castro et al. ...................... | 55/16 |
| 5,074,891 | 12/1991 | Kohn et al. ........................ | 55/158 X |
| 5,075,011 | 12/1991 | Waite ................................. | 210/644 |
| 5,085,676 | 2/1992 | Ekiner et al. ...................... | 55/158 |
| 5,085,776 | 2/1992 | Blume et al. ...................... | 55/158 X |
| 5,096,637 | 3/1992 | DiLeo et al. ....................... | 264/45.1 |
| 5,104,425 | 5/1992 | Rao et al. ........................... | 55/16 |
| 5,131,927 | 7/1992 | Bikson et al. ...................... | 55/158 X |
| 5,151,182 | 9/1992 | Perry et al. ........................ | 210/500.27 |
| 5,160,353 | 11/1992 | Gochanour ........................ | 55/158 |
| 5,176,724 | 1/1993 | Saito et al. ......................... | 55/158 |

OTHER PUBLICATIONS

*Huls Silicon Compounds, Register and Review,* Hüls America Inc., 5th Ed., 1991, pp. 259, 268 and 273.

*Primary Examiner*—Robert Spitzer
*Attorney, Agent, or Firm*—Jay M. Brown

[57] ABSTRACT

This invention provides a composite gas separation membrane comprising: (a) a porous polyacrylonitrile structural support material having a polyacrylonitrile surface; (b) a gutter layer coating comprising a crosslinked polar phenyl-containing-organopolysiloxane material on the polyacrylonitrile surface of the structural support material, leaving an uncoated gutter layer surface; and (c) an ultrathin 6FDA type polyimide selective membrane layer coating on the uncoated gutter layer surface. In preferred embodiments, the phenyl-containing-organopolysiloxane material additionally comprises a silica-sol. Processes for making the composite gas separation membrane and for using the membrane to carry out gas separations are also provided.

25 Claims, 2 Drawing Sheets

Fig. 2

| 6FDA – TYPE POLYIMIDE LAYER |
|---|
| PHENYL-CONTAINING-ORGANOPOLYSILOXANE LAYER |
| POLYACRYLONITRILE STRUCTURAL SUPPORT MATERIAL |

COMPOSITE GAS SEPARATION MEMBRANE HAVING A GUTTER LAYER COMPRISING A CROSSLINKED POLAR PHENYL-CONTAINING - ORGANOPOLYSILOXANE, AND METHOD FOR MAKING THE SAME -

FIELD OF THE INVENTION

This invention relates to the field of composite gas separation membranes. More particularly, this invention relates to such a membrane incorporating a gutter layer which comprises a crosslinked polar phenyl-containing-organopolysiloxane. The surface tension of this gutter layer is increased relative to nonpolar organopolysiloxane polymer, allowing subsequent application of an ultrathin selective membrane layer having a relatively high surface tension.

BACKGROUND

Much technology has already been developed concerning composite gas separation membranes. Fundamentally, the purpose for a composite (or "multiple-layer") membrane structure is to allow the selection and combination of multiple materials which can each perform some of the necessary functions of the overall membrane better than any one of the materials could perform all of such functions. The process of selective passage of certain types of molecules in gaseous phase through a nonporous membrane material is a complex phenomenon occurring on a molecular level. Generally, the molecular selectivity is a combination of diffusion through the membrane material (controlled by the packing and molecular free volume of the material), and gas solubility within the membrane material. Returning to the diffusion concept, the selective membrane material must have the very special performance property that certain types of molecules preferentially will pass through it, resulting in a concentration of such types of molecules on the permeate side of the membrane. Such selective membrane materials can be very expensive to develop and produce, and accordingly they command a high price. Further, since the gas molecules must physically pass through the selective membrane itself, overall membrane flux will be maximized when the selective membrane thickness is minimized. This is a crucial consideration in designing a gas separation membrane, because higher flux translates into higher productivity. Lower flux directly results in greater compression requirements to force the gas through the membrane, translating into increased operating costs. As a result of these considerations, the gas molecule selection function of a gas separation membrane is best performed by an ultrathin layer of a specially-selected, often expensive selective membrane material.

Another important function of a gas separation membrane is to withstand the pressure drop across the membrane which is encountered in and necessary for its operation, and otherwise endure a reasonable lifetime as an integral material in the intended operating environment. This function is best performed by a structural support material which (1) can be prepared economically as a relatively thick layer which will provide adequate mechanical strength, and (2) is highly permeable, so as not to markedly reduce the gas flux of the overall membrane.

Ideally, the selective membrane material is directly placed over the structural support material. The two-layer composite then combines optimum selectivity, gas flux and mechanical durability. However, disclosures have been made of many circumstances in which a gutter layer is interposed between the selective membrane material and the structural support material, in order to facilitate and improve the combination of such structural support and selective membrane materials. For example, the Browall et al U.S. Pat. No. 3,874,986 discloses the interposition of an organopolysiloxane-polycarbonate copolymer layer as a gutter between a microporous backing material (such as Acropore polyvinyl chloride-acrylonitrile copolymer) and an ultrathin polyphenylene oxide (PPO) selective membrane; the gutter overcomes delamination problems by adhering both to the PPO layer and to the Acropore backing. (We hereby incorporate by reference the complete contents of every patent and every other document which is mentioned anywhere in this application). See similarly, the Browall U.S. Pat. No. 3,980,456. The Cabasso et al U.S. Pat. No. 4,602,922 discloses a composite gas separation membrane made by in situ crosslinking of an aminoorganofunctional polysiloxane with a diisocyanate to constitute a gutter layer on the surface of a highly porous polymer substrate such as polysulfone or polystyrene; a gas separating entity such as polyphenylene oxide can then be coated on the gutter layer. (Cabasso discusses the two abovementioned Browall patents at column 7, lines 33-39).

Despite these advances, the need to further develop the composite gas separation membrane art continues, driven in part by incompatibility problems between particular polymeric materials which desirably could be incorporated in composite structures. One class of such polymers are those referred to as the "6FDA polyimides". These polymers can be formed (as illustrated in FIG. 1 of this application) by (A) the condensation of 5,5'-2,2,2-trifluoro-1-(trifluoromethyl)ethylidene-bis-1,3-isobenzofuranedione (Formula I, known as "6FDA") with an aromatic diamine such as 1,3-diaminobenzene (Formula II) or 1,5-naphthalenediamine (Formula III); and (B) dehydration to yield a 6FDA polyimide (Formula IV). The value and applicability of 6FDA polyimides as gas separation membranes is well known and documented, e.g., in the Hoehn et al U.S. Pat. Reissue No. 30,351 (based on U.S. Pat. No. 3,899,309), the Hayes U.S. Pat. No. 4,717,394, and the Ekiner et al U.S. Pat. No. 5,085,676. Asymmetric monolayer films of these polymers, moreover, can be made. However, the expensive status of these polymers virtually mandates a composite membrane structure.

The Hayes U.S. Pat. No. 4,717,394 discloses certain classes of 6FDA-type-polyimide polymers (we mean to indicate by the term "6FDA-type polyimide" that 6FDA can be replaced by another dianhydride having similar molecular structure and activity; and that the aromatic diamine can also be varied), and gas separation membranes fabricated from them. Hayes discusses the impact of relative polymer chain rigidity on membrane gas permeance, and presents means for the controlled addition of reduced chain rigidity, asserting that these modifications allow for improved membrane selectivity while still maintaining high permeance to gases. Hayes discloses that the polymers can be solution cast on a porous solvent-resistant substrate to serve as the dense separating layer of a composite membrane. In Examples 1-21, the polymers are cast on a glass plate to form a cast membrane film; in Examples 22-36, the polymers are again cast on glass, but asymmetric membranes are formed.

The Ekiner et al U.S. Pat. No. 5,085,676 is the most recent patent of which applicant is presently aware that relates to the preparation of 6FDA-type-polyimide gas separation membranes. According to Ekiner, two or more film-forming polymer solutions are simultaneously coextruded to form a nascent membrane, followed by precipitation to form a composite multicomponent membrane comprised of a dense or asymmetric gas separating layer and a microporous layer which structurally supports the separating layer. The membrane is then quenched and the remainder of the solvent is removed to form a gas separation membrane. The substrates for the 6FDA-type-polyimide polymers in Ekiner's Examples include: glass (from which a solidified membrane film is then stripped); polyether sulfone/polyvinylpyrrolidone flat sheet substrates; polyether sulfone/polyvinylpyrrolidone hollow fiber substrates; and polyamide hollow fiber substrates.

The Hoehn et al U.S. Pat. Reissue No. 30,351 (based on U.S. Pat. No. 3,899,309), discloses certain classes of aromatic polyimides, polyesters and polyamides and their fabrication into gas separation membranes. Hoehn discloses, at column 4, lines 39–54, that these polymers can be solution cast on a support to produce a sheet membrane or spun through a spinneret to yield hollow fibers. Hoehn notes that both uniform and asymmetric membranes can be made. In Hoehn's Examples concerning polyimide membrane preparation, the polymer is cast onto glass or Inconel and then stripped from it.

In spite of these developments, the need continues for improvements in membranes having ultrathin 6FDA-type polyimide selective membrane layers. In particular, composite structures which will take advantage of the demonstrated gas separation utility of 6FDA-type-polyimide polymers, while avoiding the need for great amounts of the expensive 6FDA-type-polyimide polymers, would be desirable.

SUMMARY OF THE INVENTION

According to the invention, a composite gas separation membrane is provided, comprising:

(A) a porous polyacrylonitrile structural support material having a polyacrylonitrile surface;

(B) a gutter layer coating comprising a crosslinked polar phenyl-containing-organopolysiloxane material on the polyacrylonitrile surface of the structural support material, leaving an uncoated gutter layer surface; and (C) an ultrathin 6FDA-type polyimide selective membrane layer coating on the uncoated gutter layer surface.

Further according to the invention, a process for making a composite gas separation membrane is provided, comprising the following steps:

(A) Providing a porous polyacrylonitrile structural support material having first and second surfaces, said first surface being a polyacrylonitrile surface;

(B) Preparing a mixture comprising a polar phenyl-containing-organopolysiloxane, a crosslinker and a crosslinking catalyst;

(C) Allowing the mixture to pre-cure but remain in an ungelled state;

(D) Coating said first surface with said mixture and allowing said mixture to crosslink, constituting a gutter layer on the porous polyacrylonitrile structural support material, and leaving an uncoated gutter layer surface; and (E) Coating said uncoated gutter layer surface with an ultrathin 6FDA-type polyimide selective membrane layer, leaving an uncoated 6FDA-type polyimide selective membrane surface.

According to preferred embodiments, the mixture further comprises a silica-sol.

According to particular embodiments, the polyacrylonitrile structural support material is in the form of either a flat sheet membrane, a hollow fiber or a tubular membrane.

Also provided are gas separation processes which employ the composite gas separation membranes.

Further embodiments will be described below. The various embodiments will be detailed in the discussion below, and defined in the appended claims.

BRIEF DESCRIPTION OF THE DRAWINGS

FIG. 2 is a schematic cross-sectional drawing of a composite gas separation membrane of the invention.

DETAILED DESCRIPTION OF THE INVENTION

Figure 1:
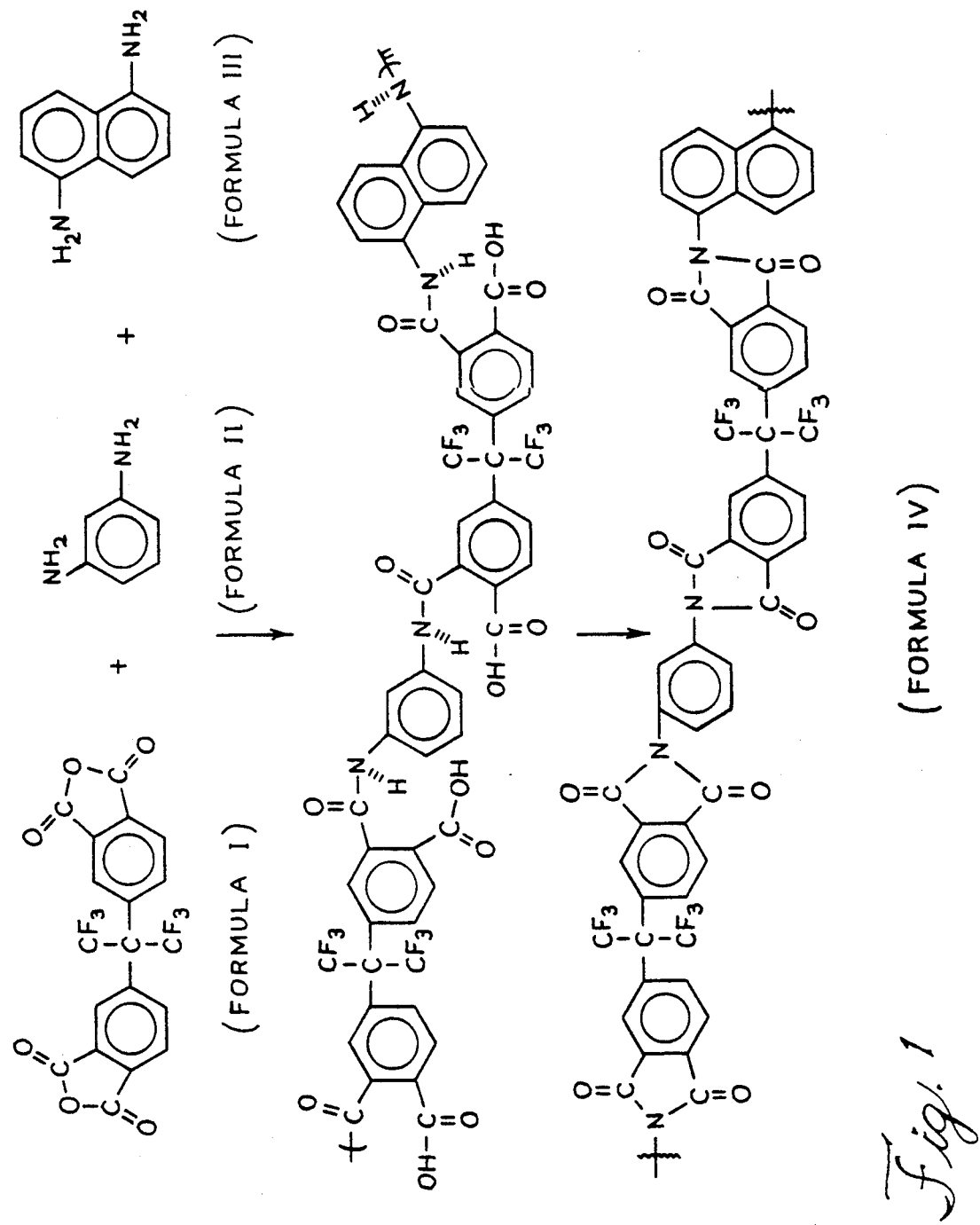
FIG. 1 is a schematic drawing of exemplary synthesis reaction schemes for making 6FDA-type-polyimide polymers, which includes Formulas I–IV referred to above in the specification.

As we have already summarized above, the Hoehn, Hayes and Ekiner patents all relate to the 6FDA-type-polyimide polymers which form the ultrathin selective membrane layer in the composite membranes of this invention. We hereby incorporate these three patents by reference in their entirety, and will rely on and refer to their teachings. We return now to these patents to discuss in further detail the 6FDA-type polyimide polymers.

We turn first to the Hayes U.S. Pat. No. 4,717,394. Hayes defines the molecular structures of the subject polymers at column 2, line 55 through column 4, line 42. Notwithstanding the considerable breadth of the there-defined classes of polymers, most of Examples 1–21 disclosing polymer synthesis (all but Examples 7–12and note the drawing of 6FDA in Example 1) call for 6FDA itself (5,5'-2,2,2-trifluoro-1-(trifluoromethyl)ethylidene-bis-1,3-isobenzofuranedione) as the principal dianhydride reagent; Examples 7–12 substitute for 6FDA, 1,2,4,5-benzenetetracarboxylic dianhydride. Concerning the diamine component, most of the same Examples employ 2,4,6-trimethyl-1,3-phenylenediamine; Examples 6 and 21 substitute 2,3,5,6-tetramethyl-1,4-phenylenediamine. Hence, despite the broad range of 6FDA-type polyimide polymers disclosed by Hayes, the Examples are almost exclusively directed to 6FDA-polyimides. (Considering that the anhydride moieties on 6FDA are the sites which react with the diamine, the substitution of 1,2,4,5-benzenetetracarboxylic dianhydride is logical and can be expected to succeed, purely as a matter of molecular structure and activity). The point we are making is that Hayes confirmed the operability of the classes of polymers described at columns 2–4 as gas separation membranes essentially by experiments carried out solely on 6FDA polyimides. We accordingly adopt the Hayes disclosure including all polyimide polymers disclosed in Hayes and especially as summarized at column 2, line 55 through column 4, line 42, as included within the definition of "6FDA-type polyimide" for purposes of this specification.

Next, we return to the Ekiner et al U.S. Pat. No. 5,085,676. Ekiner defines the molecular structures of its subject polyimide polymers at column 4, line 22 through column 5, line 60. The following of Ekiner's 59 Examples all disclose polyimide syntheses in which 6FDA itself is a reagent: Example 5 (including a drawing of 6FDA); (see also 6-13); Example 14 (noting that U.S. Pat. No. 4,705,540 teaches the preparation of 6FDA; we hereby incorporate such patent by reference in its entirety into this application); (see also Examples 15-17); and Examples 29, 30-37, 39, 41-47, 48, 51-52, 53 and 54. Example 38 substitutes 3,3',4,4'-benzophenonetetracarboxylicdianhydride for the 6FDA (again, the molecular structure of this dianhydride and its predictable activity make this a logical substitution). Aromatic diamines are also used in every one of these Examples, including: 2,3,5,6-tetramethyl-1,4-phenylenediamine; 4,4'-[1,4-phenylenebis(1-methylethylidene)]bisaniline; 2,4,6-trimethyl-1,3-phenylenediamine; 2,2-bis[4-(4-aminophenoxy)-phenyl]propane; 2,7-bis(4-aminophenoxy)-naphthalene; 4,4,-methylene-bis(2,6-diisopropylaniline); 1,4-bis(4-aminophenoxy)benzene; 4,4'-bis(4-aminophenoxy)-biphenyl; 1,3-bis(4-aminophenoxy)benzene; and 4,4'-(methylethylidene)bisaniline. We make the same conclusions here as with Hayes; we accordingly adopt the Ekiner disclosure including all of the polyimide polymers it discloses, especially as summarized at column 4, line 22 through column 5, line 60, as included within the definition of "6FDA-type polyimide" for purposes of this specification.

Finally, we now turn to the Hoehn et al U.S. Pat. Reissue No. 30,351 (based on U.S. Pat. No. 3,899,309). Although Hoehn discloses classes of three basic polymer types (polyimides, polyesters, and polyamides), we are primarily concerned with Hoehn's teachings concerning polyimides. Hoehn defines the subject polyimides in various passages of its specification, the principal disclosures being at column 2, lines 3-20; column 2, line 49 through column 3, line 68; and column 6, line 10 through column 7, line 40. Hoehn also gives a listing of specific dianhydrides (Table I, column 8), and diamines (Table II, columns 8-11), which can be employed to synthesize polyimides. Dianhydride number 6 in Table I, 3,4,3',4'-diphenyldi(trifluoromethyl)methanetetracarboxylicdianhydride, is another name for 6FDA. Example 15 of Hoehn employs 3,4,3',4'-diphenylhexafluoroisopropylidenetetracarboxylicdianhydride, which is a further name for 6FDA (see the Figure accompanying the Example). See also, Examples 16, 17, 18, 19 (and 28), 20 (and 29), 21, 23, 24 and 25. Examples 13 and 14 substitute pyromellitic dianhydride (see Table I of Hoehn) for the 6FDA, another logical substitution. The diamines employed in these Examples include: 4-isopropyl-1,3-diaminobenzene; 1,5-diaminodiphenylether; diaminonaphthalene; 4,4'-diaminodiphenylether; metaphenylenediamine; paraphenylenediamine; N,N'- metaphenylenebis(m-aminobenzanilide); 3,5-diaminobenzoic acid; and 3,3 -diaminobenzanilide. We further note that Hoehn discloses both in its general discussion and Examples that copolymers and blends of the polyimides with the polyesters and/or polyamides can also be made and used. Hence, although this invention is directed to membranes having polyimide selective membrane layers, such polyesters and polyamides can be combined with the polyimides as used in this invention, so long as at least about 50% by weight of the copolymer or blend is constituted by the polyimide.

In sum, the term "6FDA-type polyimide" for purposes of this invention includes and is constituted by the above-discussed disclosures of all such polymers included in the Hoehn et al U.S. Pat. Reissue No. 30,351 (based on U.S. Pat. No. 3,899,309), the Hayes U.S. Pat. No. 4,717,394, and the Ekiner et al U.S. Pat. No. 5,085,676. In the case of any conflicts between the teachings of these three patents, our intention is to include every 6FDA-type polyimide referred to in any one or more of these three patents. As we have seen, 6FDA itself is the dianhydride of choice for producing 6FDA-type polyimides. We will frequently refer to it specifically in the ensuing discussion, recognizing that the other polymers encompassed by the term "6FDA-type polyimide" can readily be substituted for 6FDA-polyimides.

As we now explain, considerations of solvent compatibility and membrane fabrication procedure point strongly to polyacrylonitrile (PAN) as the polymer of choice to use in preparing the structural support material for the ultrathin 6FDA-polyimide selective membrane layer. Our overall goals are to maximize the composite membrane gas selectivity and minimize consumption of the expensive 6FDA-polyimide, while retaining good overall membrane gas flux.

The structural support material has to meet several requirements: it must give adequate mechanical strength to the overall composite membrane, and it serves as a foundation for the ultrathin 6FDA-polyimide selective membrane layer. Given the high transmembrane pressures normally employed in gas separation processes, we prefer to start with a conventional support cloth. Such support cloths are generally high-mechanical-strength porous cloth materials which have a smooth surface and will not significantly reduce gas flux. The support cloths for use in the invention should also be hydrophilic. Preferably, the support cloths are made from DACRON ® polyester or HOLLYTEX ® polyester. The HOLLYTEX ® polyester is most preferred. DACRON ® polyester tends to be smooth and flat without fiber spikes/defects (which in itself is advantageous from the standpoint of applying a smooth and uniform coating thereon); but the DACRON ® polyester is less hydrophilic than HOLLYTEX ® polyester, and consequently the PAN cannot adhere to it as well as to HOLLYTEX ® polyester. Nylon support cloths generally yield unacceptable results.

In serving as a foundation for the ultrathin 6FDA-polyimide selective membrane layer, the support cloth would, standing alone, allow the ultrathin 6FDA-polyimide selective membrane layer to collapse into the porous regions of the support cloth. Hence, we add a structural support layer on top of the support cloth, interposed between the support cloth and the ultrathin 6FDA-polyimide. Generally, as has been well documented in the prior art, such a structural support layer is typically made by dissolving a suitable polymer in a solvent, casting a film on the support cloth, and quenching the film in a non-solvent for the polymer which is nevertheless miscible with the solvent in which the polymer was cast. With ever-increasing pressure to reduce the use of chemical solvents in response to worker safety and health issues, environmental emission controls, and solvent cost, water is the quenching solvent of choice. Water being a polar material, a water quench means that to be miscible with it, a polar casting solvent is needed. This in turn means that the polymer to be cast as the structural support material is preferably itself polar.

The 6FDA-polyimide polymers are also polar. Thus, the 6FDA-polyimide polymer should also be dissolved in a suitable polar solvent. Here we reach a problem: if both the 6FDA-polyimide and the structural support material can be dissolved in polar solvents, then when the 6FDA-polyimide is brought into contact with the structural support material, the solvent in the 6FDA-polyimide may tend to dissolve the surface of the structural support material. This spells instant disaster for the composite membrane, because dissolution of the structural support surface will close the surface pores, and the gas flux will accordingly be reduced. The uneven surface will also lead to pinholes in the ultrathin 6FDA-polyimide selective membrane layer, allowing free flow of gas through the membrane and nullifying its separation potential. Fortunately, 6FDA-polyimides generally can be readily dissolved in moderate solvents such as acetone, methyl ethyl ketone, and dioxolane. This makes possible the selection of a polar material for the structural support which can only be dissolved in strong solvents. Polyacrylonitrile (PAN) is almost uniquely suited to this task. PAN can be dissolved in strong solvents such as 1-methyl-2-pyrrolidinone, dimethylacetamide and dimethyl sulfoxide, but is highly resistant to chlorinated hydrocarbons and almost all other low-boiling and moderate solvents such as acetone, hexane, heptane, tetrahydrofuran, methyl ethyl ketone, isopropanol and methylene chloride. We note that substituted polyacrylonitriles, such as poly-(2-methylacrylonitrile), generally have reduced (or eliminated) solvent resistance, and should be avoided. The commercially-available PAN polymer we have used is a copolymer of acrylonitrile and methyl acrylate made by DuPont under the name Polymeric Acrylonitrile Type A-7, having a weight average molecular weight of 100,000, which is predominantly polyacrylonitrile, but also contains a minor amount of methyl acrylate and certain unknown copolymer additives. These additives (including the methyl acrylate) will not interfere with the preparation of membranes according to this invention so long as such additives constitute a minor fraction, preferably less than about 25% by weight, more preferably less than about 10% by weight, and most preferably essentially 0% of the overall PAN polymer. Polyacrylonitrile polymers and structural support materials suitable for use according to the invention have been previously disclosed in: Perry et al U.S. Pat. No. 5,151,182 (see, e.g., column 6, line 18 through column 7, line 6); Linder et al U.S. Pat. No. 5,039,421 (see, e.g, column 3, line 43 through column 6, line 59); and see generally, Michaels U.S. Pat. No. 3,615,024 and Michaels et al U.S. Pat. No. 3,526,588. Other types of polymers which we speculate might be usable instead of PAN, are polytetrafluoroethylene and Nylon 6. However, to our knowledge, no one has produced acceptable structural support materials from these polymers; they are much (100 times) more difficult to dissolve even in strong solvents such as 1-methyl-2-pyrrolidinone, and it may be necessary to dissolve and cast them in strong inorganic acids. The undesirability of these latter process steps from environmental, safety and health standpoints is obvious. We will refer below in this discussion specifically to PAN; materials that could appropriately be substituted for PAN, in view of this discussion, are included in the scope of our intended meaning for PAN.

The PAN structural support layer will generally have pores ranging in size between about 50 Å and about 300 Å; and preferably between about 100 Å and about 200 Å. The ultrathin 6FDA-polyimide selective membrane layer should generally have a thickness of about 1,000 to about 3,000 Å; preferably about 1,000 to about 2,000 Å; and most preferably about 1,000 Å. (As we will see in the discussion below of procedures for coating the 6FDA-polyimide onto the gutter layer, even thinner 6FDA-polyimide selective membrane layers are desirable. However, as deposited in such an ultrathin coating onto the gutter layer, the 6FDA-polyimide solution may have an increasing tendency to bead up on the gutter layer in discontinuous droplets. The minimum recommended target thickness of 1,000 Å represents a compromise of these considerations). If such an ultrathin 6FDA-polyimide selective membrane layer is deposited (as a solution) directly on top of the PAN structural support material, capillary forces will induce the 6FDA-polyimide molecules and oligomers to flow into the surface pores of the PAN. Moreover, the surface pores of the PAN would be largely filled by the 6FDA-polyimide, resulting in a major drop in gas permeance through the membrane.

Accordingly, we provide a polysiloxane-based gutter layer between the PAN structural support material and ultrathin 6FDA-polyimide selective membrane layer. In addition to preventing the ultrathin 6FDA-polyimide solution coating, which forms the selective membrane layer, from flowing into the surface pores of the PAN, the gutter layer will also (1) provide a flexible cushion for the ultrathin 6FDA-polyimide selective membrane layer; and (2) enhance the flow of permeating gases through the composite membrane by providing distribution channels to equalize the gas flow across the membrane surface. In addition, the polysiloxane-based gutter layer will provide adequate mechanical strength to the overall composite membrane so that the membrane will not crack.

Silicones having an organosiloxane polymer structure are the material of choice for a gutter layer. They are characterized by extremely high gas permeance; and they form a very smooth surface, ideal for subsequent deposition of the ultrathin 6FDA-polyimide selective membrane solution coating. Although an organosiloxane solution coating deposited on the PAN structural support material will fill the surface pores of the PAN to some extent, the high permeance of the organosiloxane itself will generally maintain the overall composite membrane gas permeance high enough to readily facilitate commercial high-volume applications. The broad concept of a polysiloxane gutter layer for a gas separation membrane has been previously disclosed, as discussed earlier. However, the relative surface tension of 6FDA-polyimides as compared with conventional polysiloxanes presents another obstacle to composite membrane fabrication.

The 6FDA-polyimide will be dissolved in a solvent, directed into a trough, and meniscus-coated by an advancing web of the PAN support (which has been previously coated with an intermediary polysiloxane gutter layer; the details of these processes will be discussed in more detail later). At the point where the coating occurs, the 6FDA-polyimide solution will adhere to the polysiloxane surface and the solvent will evaporate to form a solid film. The surface tension of the 6FDA-polyimide coating solution is a critical consideration in this adherence process. If a solution is to be coated onto a substrate to form a continuous film, the solution being coated must generally have a lower surface tension than the substrate. Otherwise, the coating solution will tend to bead up on the substrate, making the composite useless as a membrane. In such cases, in order to produce a uniform and continuous coating of the solution on the substrate, it may be necessary to either deliberately increase the viscosity of the coating solution or increase the thickness of the coating layer. Clearly, such measures run counter to our intent in producing an ultrathin 6FDA-polyimide selective membrane layer on the polysiloxane gutter layer. Returning to our particular materials of concern, the surface tension of nonpolar polysiloxane polymers themselves is about 18 to 20 dyne/centimeter; the surface tension of 6FDA-polyimide polymers themselves is about 30 to about 35 dyne/centimeter, and the surface tension of the solvent for the 6FDA-polyimide is about 20 to 25 dyne/centimeter. Since the 6FDA-polyimide polymer is dissolved in a solvent to facilitate the coating process, it is the surface tension of the solution that should be equal to or less than that of the polysiloxane substrate layer. However, depending on the solvent system employed, the low surface tension of the polysiloxane polymer as compared with that of the 6FDA-polyimide polymer (and its solvent) may make it difficult to coat the 6FDA-polyimide solution on the polysiloxane layer without a tendency of the solution to bead up.

Hence, in accordance with the invention, we provide a specially-formulated polysiloxane gutter layer between the PAN structural support and the ultrathin 6FDA-polyimide selective membrane layer, comprising a crosslinked polar phenyl-containing-organopolysiloxane having a substantially increased surface tension.

In formulating the solution which yields the gutter layer, we must return to further consideration of the relative surface tension of the materials in the various composite membrane layers. The PAN polymer constituting the structural support will have a relatively high surface tension, for example about 44 dyne/centimeter, and the structural support is porous, thus having an irregular surface with a very high surface tension which allows the polysiloxane solution to easily and uniformly spread on its surface. The 6FDA-polyimide polymer itself generally will have a surface tension of about 30 to about 35 dyne/centimeter. Aliphatic organosiloxane polymers such as dimethylsiloxane (Formula V below; m can be any whole number, including 0) themselves generally have a surface tension of about 18–20 dyne/centimeter.

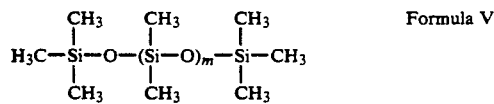

Formula V

Were we to attempt to coat a selective membrane layer-forming solution of a 6FDA-polyimide polymer in a solvent onto a gutter layer made from such an organosiloxane polymer, the 6FDA-polyimide solution would tend to bead up, or in any event would tend to be poorly adhered to the organosiloxane gutter.

Realizing that an organosiloxane gutter layer with a surface tension more closely approaching that of the solution comprising 6FDA-polyimide polymer and solvent would improve the adhesion between the gutter and polyimide layers, we set out to increase the surface tension of the organosiloxane polymer. Aliphatic organosiloxane prepolymers in which aliphatic moieties (such as $CH_3-$) have been replaced by polar groups (including aromatic moieties) are commercially available. For example, a portion of the $CH_3-$ groups in Formula V can be replaced by phenyl groups, yielding a phenyl-containing organosiloxane prepolymer. The prepolymer can also be given vinyl end groups to facilitate crosslinking. Formula VI illustrates the structure of a diphenyl-dimethylsiloxane coprepolymer with vinyl end groups (PHE represents a phenyl group), which is preferred for use in the invention.

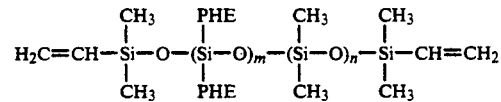

Formula VI

In varying the formulation of the prepolymers represented by Formula VI, the values of m and n represent corresponding percentages of the prepolymer (except for the indicated end groups), and can each vary between 0 and 100% (their sum being 100; limitations in the synthetic process may prevent polymers with some proportions difficult or impossible to synthesize).

We know that as the polarity of the organopolysiloxane increases, so will its surface tension; and we know from the EXAMPLES reported below, that the use of phenyl-containing organopolysiloxanes according to this invention yields improved application of the 6FDA-polyimide separation membrane layers. We have attempted to identify other types of organopolysiloxane prepolymers suitable for use. Generally, in order to yield satisfactory results, an organopolysiloxane prepolymer must: (1) be readily crosslinked; (2) be crosslinkable at or near room temperature (above about 70° C., the PAN porous support will begin to soften, resulting in surface pore closure, leading to reduced gas flux; vinyl end groups are advantageous in carrying out room temperature curing); (3) have sufficiently high surface tension; and (4) form a film having high gas permeance. A multitude of other organopolysiloxanes are commercially available (see Huls Silicon Compounds, Register and Review, Hüls America Inc., 1991). We have been unable to identify any such other organopolysiloxanes that meet all of the above standards. However, based on our understanding of the polymer chemistry, we would expect that polysiloxanes similar to those discussed above (having the appropriate phenyl-substitution) but in which the $CH_3-$ groups are replaced by ethyl or propyl groups, would yield acceptable results.

In determining the desired degree of phenyl substitution on the polysiloxane prepolymer for use in formulating a gutter layer, it is important to recognize that as the degree of phenyl substitution increases, permeance of gas molecules through the gutter layer correspondingly decreases. In balancing these considerations, generally a minor proportion of the available silicon-bonding sites on the siloxane prepolymer should be phenyl-substituted, in order to retain adequate permeance. Preferably, the degree of phenyl substitution is less than about 30% of the available silicon-bonding sites, and more preferably, the degree of substitution is between about 15% and about 25% of the available silicon-bonding sites. Where the degree of substitution is less than about 10%, inferior results are generally obtained because the surface tension of the phenyl-containingorganopolysiloxane prepolymer constituting the resulting gutter layer is too low. Suitable organosiloxanes for use include some of those formerly marketed by Petrarch Systems, and currently available from Hüls America Incorporated. For example, a diphenyldimethylsiloxane prepolymer (16% diphenyl, 84% dimethyl [weight average molecular weight ("wamw")=9,300; viscosity at ambient temperature=500 centipoise ("cps")]) is marketed by the designation: PS-782. A variation which is 23.5% diphenyl, 76.5% dimethyl [wamw=13,200; viscosity=1,500 cps] is marketed by the designation: PS-793. Other grades that can be used and which are 16% diphenyl and 84% dimethyl include: PS-783 [wamw=18,900; viscosity=1,000 cps]; PS-784 [wamw=35,300; viscosity=5,000 cps]; PS-785 [wamw=54,900; viscosity=10,000 cps]; and PS-786 [wamw not available; viscosity=30,000 cps]. Other grades which are 16% diphenyl and 84% dimethyl include: PS-787.5 [wamw=118,600; viscosity=60,000 cps]; and PS-788.5 [wamw=195,000; viscosity=150,000 cps]. However, these latter two grades have higher molecular weights than the others, resulting in higher viscosity and shorter curing time which may be disadvantages. Two related series of polymer grades having insufficient phenyl substitution for that reason are less preferred. These include a group which are 3% diphenyl and 97% dimethyl (PS-732, PS-735 and PS-737.5), and a group which are 5% diphenyl and 95% dimethyl (PS-762, PS-765 and PS-767.5). (see *Huls Silicon Compounds, Register and Review*, Hüls America Inc., 5th Ed., 1991), page 273. Organosiloxanes suitable for use according to the invention are also disclosed in: Henis et al U.S. Pat. No. 4,230,463 (e.g., see column 19, line 43 through column 21, line 25); and Iwama et al U.S. Pat. No. 4,618,534 (see, e.g., column 5, line 45 through column 8, line 66).

Even in using a preferred diphenyldimethylsiloxane prepolymer, the surface tension of the siloxane polymer layer may still be inadequate in some cases to allow defect-free coating by the 6FDA-polyimide solution and good adhesion by the resulting 6FDA-polyimide layer. Hence, according to preferred embodiments of the invention, the siloxane prepolymer is modified to further raise its surface tension by the addition of a colloidal suspension of micron-sized agglomerated particles of silicon dioxide ($SiO_2$) in a suitable dispersant; we call such suspension a "silica-sol". Generally, the silica particle diameter in the silica-sol should be less than about one micron; preferably, the particle diameters range from about 0.01 to about 0.5 micron. Silica, the basic component of plate glass, is a polar material having very high surface tension. A silica-sol is not merely an agglomerated particle suspension. The agglomerates are actually (based on available information) silica micelles in which particles align themselves into sphere-like agglomerations with their charged portions oriented outward. Although the silica and siloxane do not covalently bond when physically combined and mixed together, the result is a significant further increase in the surface tension of a film prepared from the overall mixture. Currently, we have been able to raise the surface tension of the eventual phenyl-containing-organopolysiloxane gutter layers to about 25-30 dyne/centimeter, roughly equivalent to that of the 6FDA-polyimide solutions. Given that the surface tension of 6FDA-polyimide solutions may be as high as about 30-35 dyne/centimeter, raising the gutter layer surface tension to about 40 dyne/centimeter would be ideal. It is important to note that silica-sols generally cannot be effectively combined with dimethylsiloxanes having no phenyl (or other polar) substitution; without polar-substitution in the siloxane, there is nothing in the siloxane with which the polar silica-sol is miscible. In addition, since the siloxane and silica-sol are both dispersed in appropriate solvents, it is important to ensure that the solvent systems for the siloxane and silica-sol are mutually miscible. Silica-sols are commercially available from Nissan Chemical Industries, Ltd. Of those silica-sols currently available from Nissan, we prefer type MA-ST, which is identified as 30% $SiO_2$ (by weight) in methanol, having a silica particle size (diameter) of 0.01 micron, a pH of 3-5, and a viscosity of 1-5 centipoise at 25° C. Nissan offers other grades of silica-sols dispersed in other solvents, including isopropanol, ethylene glycol, ethylene glycol-mono-n-propyl ether, and dimethylacetamide. Of these, we have tried the isopropanol grade (IPA-ST), with mediocre results. We believe that the purity of these silica-sols is the key to selecting a silica-sol that will give good results. Water and other impurities can poison the platinum catalyst for crosslinking of the phenyl-containing-organopolysiloxane, resulting in incomplete cure of the gutter layer (which in turn leads to migration of siloxane through the 6FDA-polyimide layer, reducing flux and membrane selectivity). Nissan markets a series of silica-sols called "SNOWTEX" which are dispersed in water: these materials cannot be used in the invention without poisoning the platinum catalyst.

The amount of silica-sol employed is preferably about 25-75% by weight compared with the phenyl-containing-organopolysiloxane (excluding the solvents). More preferably, the amount of silica-sol employed is about 30-50% by weight compared with the phenyl-containing-organopolysiloxane (excluding the solvents). If the amount of silica-sol employed is, say, less than about 10% by weight, the effect of the silica-sol on the surface tension of the gutter layer will usually be negligible. Conversely, if a very high concentration of silica-sol is used, say, above about 90%, the permeance drop in the gutter layer will generally be unacceptably large.

According to preferred embodiments, the siloxane prepolymer undergoes partial curing by the addition of a conventional crosslinker before it is combined with the silica-sol. The purposes for this are to (1) ensure that the silica-sol does not unduly hamper crosslinking of the siloxane, and (2) increase the siloxane polymer chain length before the solution forming the gutter layer is deposited on the PAN support material, to reduce the tendency of siloxane molecules to be absorbed into pores on the surface of the PAN. (Inadequate crosslinking leads to migration of siloxane monomers and oligomers into the 6FDA-polyimide selective membrane layer, which reduces membrane permeance and selectivity.) As the prepolymer curing proceeds, the prepolymer solution viscosity gradually increases, and then the prepolymer passes into a gel state. The gel state is in between liquid and solid states; it is the point when substantially all of the prepolymer molecules have organized themselves into a connected three-dimensional structure. Once gelation occurs, the prepolymer structure is irreversibly set, and the prepolymer cannot be re-dissolved. The prepolymer solution should be coated onto the PAN structural support before gelation occurs, to ensure good adhesion. Hence, the prepolymers are preferably pre-cured until their viscosity has increased, but before they approach the gelation point; enough curing time should be allowed for the coating process to be subsequently completed before gelation. Gelation can be visually observed. Although the silica-sol and siloxane could be directly combined before addition of the crosslinker, this practice may make it difficult to crosslink the phenyl-containing-organopolysiloxane gutter layer.

Generally, the conventional crosslinker will have the structure in Formula VII (in which x and y can each be any whole number, including 0):

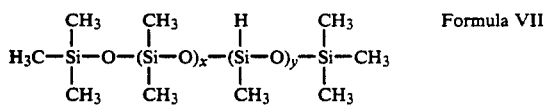

The hydride groups of the crosslinker will undergo a condensation reaction with the vinyl moieties on the siloxane prepolymer, thus partially crosslinking the siloxane When the silica-sol is then added to the prepolymerized siloxane, the silica particles in the silica-sol become dispersed throughout the material. If impurities are present in the silica-sol (water, etc.), they may interfere with the chemical reaction between siloxane and crosslinker by poisoning the platinum catalyst. Hence, the silica-sol content must be controlled in proportion to the siloxane by monitoring any such interference in curing, so that adequate crosslinking and cure can be obtained. Suitable crosslinkers include a product marketed by Hüls America Inc. under the designation PS 122, which is a trimethylsilyl-terminated polymethylhydrosiloxane having a weight average molecular weight of 4,500–5,000 and a viscosity at ambient temperature of 85 cps. Another suitable crosslinker is a trimethylsilyl-terminated methylhydro, dimethylsiloxane copolymer having a weight % ("wt. %") of methylhydro groups of 30–35%, a weight average molecular weight of 2,000–2,100 and a viscosity at ambient temperature of 25–30 cps, marketed under the designation PS 123. Other grades having the trimethylsilyl-terminated polymethylhydrosiloxane structure which can be used include PS 118 (wamw=360–420; viscosity at ambient temperature=2–5 cps); PS 119 (wamw=1,500; viscosity at ambient temperature=20 cps); and PS-120 (wamw=2,270; viscosity at ambient temperature=30 cps). Other grades having the trimethylsilyl-terminated methylhydro, dimethylsiloxane copolymer structure which can be used include PS 122.5 (wt. % methylhydro=50–55%; wamw=900–1,000; viscosity at ambient temperature=10–15 cps); and PS 123.5 (wt. % methylhydro=15–18%; wamw=25–35; viscosity at ambient temperature=25–35 cps). Another trimethylsilyl-terminated methylhydro, dimethylsiloxane copolymer grade, PS 123.8, could be used except that it contains only 0.5–1.0 weight % of methylhydro groups, and will therefore cure the gutter layer very slowly if at all (see *Huls Silicon Compounds, Register and Review*, Hüls America Inc., 5th Ed., 1991, page 259).

The crosslinking reaction is catalyzed by a conventional catalyst, e.g., a platinum-type catalyst, which is dispersed in the mixture of siloxane and crosslinker. The amount of catalyst added to the mixture should be controlled so that the curing reaction does not proceed too quickly to allow effective preparation of the final coating mixture and its application to the PAN support material. A suitable catalyst is marketed by Hüls America Inc. under the designation PC072, identified as a platinum divinyl complex containing 2–3% platinum by weight, suspended in xylene. (see *Huls Silicon Compounds, Register and Review*, Hüls America Inc., 5th Ed., 1991, page 268). Those of ordinary skill in the art will be able to select other suitable crosslinking catalysts.

We have not yet discussed the solvent systems for the siloxane, crosslinker, silica-sol and catalyst. Regardless of the solvent system employed, water must be scrupulously eliminated. Water will block polymerization of the phenyl-containing-organopolysiloxane by poisoning the platinum catalyst. Also —CN and sulfides must be eliminated.

Suitable solvents for the phenyl-containing-organopolysiloxane include acetone, methylene chloride, and their mixtures; methyl ethyl ketone and tetrahydrofuran should be avoided, because they will poison the crosslinking catalyst and prevent complete curing of the phenyl-containing-organopolysiloxane; other solvent systems can be evaluated on a case by case basis. These same solvents are appropriate for the crosslinker, silica-sol and catalyst, if available.

Concerning the selection of solvents for the 6FDA-polyimide, three requirements are paramount: (1) the solvent must dissolve the polymer so that an ultrathin film can be coated onto the gutter layer; (2) the solvent must not attack the gutter layer; and (3) the solvent should have a relatively low surface tension (during the coating process for the 6FDA-polyimide layer, the low surface tension of the solvent is very important in order to allow uniform ultrathin coating formation over the gutter layer). Suitable solvents for 6FDA-polyimides from the standpoint of their ability to dissolve the 6FDA-polyimide polymer include: acetone, methyl ethyl ketone, methylene chloride, tetrahydrofuran and dioxolane. However, from the standpoint of non-attack of the gutter layer, acetone, methyl ethyl ketone, dioxolane and mixtures, are preferred. Methylene chloride and tetrahydrofuran tend to attack the gutter layer. Other solvents should be evaluated on a case by case basis.

In order to minimize the presence of water in the gutter layer coating solution, the preparation of the gutter layer materials and the gutter layer coating process should be carried out in a controlled low-humidity environment. Preferably, the relative humidity in the area where these operations are carried out is kept below about 30%; more preferably, below about 25%; and most preferably, 0% (a totally dry environment). Further, the presence of water in the siloxane, crosslinker, silica-sol and the solvent systems for these ingredients must also be carefully controlled and minimized. Other materials conventionally known to poison the platinum-based catalyst should similarly be avoided.

The ultrathin 6FDA-polyimide selective membrane layer of the composite membranes of the invention is vulnerable as the top, exposed composite membrane layer, to abrasion and tearing as a result of any unintended contact with foreign materials in handling or use. Therefore, in preferred embodiments, a protective coating is applied over the ultrathin 6FDA-polyimide selective membrane layer. Any material taught in the art as useful for forming a protective layer on a gas separation selective membrane can be employed, so long as the material and the solvent used to dissolve it during coating, do not dissolve or react with the ultrathin 6FDA-polyimide selective membrane layer. Particularly preferred for use as protective top coatings are the SYLGARD ® silicones available from Dow Corning Corporation. The use of these materials as protective top coatings and methods for their application are disclosed, for example, in: Henis et al U.S. Pat. No. 4,230,463 (see, e.g., the Examples); and Ekiner U.S. Pat. No. 5,085,676 (see, e.g., the Examples).

Referring to FIG. 2, the structure of a composite gas separation membrane of the invention is schematically shown in cross-section. The drawing is not to scale, due to the order of magnitude of the differences in thickness of the various membrane layers. By far the thickest layer is the PAN structural support material. Here we show the PAN and support cloth as an integral membrane layer; its total thickness is on the order of 250 microns [(support cloth, about 125 microns)+(PAN, about 125 microns)=about 250 microns]. The phenyl-containing organopolysiloxane gutter layer, coated on the PAN surface, is on the order of 1 micron thick. Finally, the 6FDA-polyimide selective membrane layer, coated on the gutter surface, is on the order of 0.1 micron (1,000 Å) thick. These layer thicknesses are exemplary; see the discussions elsewhere herein of thickness considerations for the various composite membrane layers. No optional protective layer is shown in the Figure.

Having discussed all of the components of the composite membranes of the invention in detail, we will now give an overview of the process for making the membranes. We begin with the PAN structural support material on a support cloth; this is prepared conventionally, e.g. as detailed in the prior art mentioned previously. Preferably, the PAN structural support material is prepared by dissolving the PAN in a suitable solvent, coating the PAN on a support cloth web, passing the coated web into a gelation bath (containing a solvent which is a non-solvent for PAN but miscible with the PAN solvent), and allowing the PAN to dry. Typically, the suitable support cloths will have a thickness on the order of about 125 microns. Although the thickness of the PAN coating is not critical, preferably the PAN coating has a thickness on the order of about 125 microns. Desirably, (although not required to achieve good results) the PAN solution is supplemented by the addition of polyethylene glycol (e.g., PEG 600, a polyethylene glycol having a weight average molecular weight of about 570 to about 630, sold by Fisher Scientific), which is conventionally known to enhance the porosity of a PAN porous film. The PEG 600 is miscible with the PAN (in a common solvent), but when the PAN is quenched in a water bath, is also dissolved by the water; consequently it leaches out of the PAN film, leaving voids that contribute to the PAN film's porosity.

The crosslinked polar phenyl-containing-organopolysiloxane gutter layer is then coated onto the PAN structural support material. According to preferred embodiments, a meniscus coating process is used. This is a conventional film-coating technique well-known to those of ordinary skill in the art. To carry out this process, a cylindrical roller is suspended over a trough filled with the phenyl-containing-organopolysiloxane in solution, so that the leading edge of the circumferential surface of the roller touches the surface of the solution in the trough, forming a meniscus of the solution adjacent the leading edge. The PAN structural support material is then directed over the roller to pass between the leading edge of the roller and the solution. The roller is then driven on its longitudinal axis to carry the PAN structural support through the trough, where the PAN picks up a coating of the phenyl-containing-organopolysiloxane solution from the meniscus. For best results, the concentration of the phenyl-containing-organopolysiloxane in the solution should generally be less than about 5% by volume, preferably less than about 3% by volume, and most preferably about 2-3% by volume. The thickness of the resulting coated layer of phenyl-containing-organopolysiloxane is desirably about one micron; the solution concentrations we have indicated above are appropriate to yield good results. Although this coating process is preferred, it is not required. Any other coating process known to those of ordinary skill in the art for applying a coating of such a prepolymeric solution to a substrate, may be substituted. If a PAN flat sheet web is used, this can be a continuous process. Further details are given in particular trials as reported in the EXAMPLES below. Coating processes for applying polysiloxane coatings to substrates in general are well known in the art, and are disclosed, for example, in: Kuzuse et al U.S. Pat. No. 4,590,098 (e.g., see column 7, line 20 through column 9, line 16); Iwama et al U.S. Pat. No. 4,618,534 (see, e.g., column 7, line 42 through column 10, line 21); see also Henis et al U.S. Pat. No. 4,230,463 (e.g., see column 18, line 3 through column 20, line 66).

Next, the ultrathin 6FDA-polyimide selective membrane layer is applied over the crosslinked polar phenyl-containing-organopolysiloxane. Preferably, the ultrathin 6FDA-polyimide selective membrane layer is applied using a meniscus coating process, as described above. However, this process can be carried out as disclosed in the prior art concerning ultrathin selective membrane layers of composite membranes generally, as well as is disclosed particularly concerning 6FDA-polyimide polymers and membranes. For example, see: Cabasso et al U.S. Pat. No. 4,602,922 (see, e.g., column 6, line 41 through column 7, line 23); Ekiner et al U.S. Pat. No. 5,085,676 (see, e.g., column 2, line 58 through column 3, line 11); and generally, Castro et al U.S. Pat. No. 5,049,167. In some cases, the crosslinked polar phenyl-containing-organopolysiloxane may not completely cure (especially in case of excessive interference by impurities such as water in the solvent or silica-sol which seriously retard the crosslinking reaction). When this happens, the non-crosslinked siloxane molecules can leach out of the gutter layer and penetrate the ultrathin 6FDA-polyimide selective membrane layer, resulting in decreased composite membrane selectivity and permeance. Membranes having these problems can be screened out by (1) feeling the surface of the completed crosslinked polar phenyl-containing-organopolysiloxane layer—if it is tacky, the curing is incomplete; and (2) feeling the surface of the ultrathin 6FDA-polyimide selective membrane layer—if it is slippery, leaching of the crosslinked polar phenyl-containing-organopolysiloxane layer has occurred.

This invention is not limited in its application, to flat sheet membranes. The teachings above apply equally to hollow fibers and tubular membranes. In case of the former, there is no need for a support cloth. The latter are analogous to hollow fibers, but on a larger scale; they are typically made by a conventional blown extruded film process, instead of the spinneret extrusion typically used to make hollow fibers; tubular membranes are on the order of ten-hundred times or more larger in diameter than hollow fibers. They can also be applied, e.g., to flat sheet membranes which will subsequently be configured into disc or spiral-wound type modules; and to hollow fibers which will subsequently be woven into fabric, the fabric optionally to then be configured into spiral-wound type modules.

The composite membranes of this invention can be applied to all known gas separation end uses for 6FDA-type polyimide membranes. For example, the composite membranes can be used to separate methane from nitrogen, carbon dioxide and/or helium. The composite membranes can also be used for the separation of oxygen from air to provide enriched oxygen to provide enhanced combustion; for the separation of nitrogen from air to provide inerting systems; in the recovery of hydrogen from hydrocarbon gas in refinery plants; for the separation of carbon monoxide from hydrogen in syngas systems; for the separation of carbon dioxide or hydrogen sulfide from hydrocarbons; and for the separation of helium from nitrogen. For further background we refer, for example, to: Ekiner et al U.S. Pat. No. 5,085,676 (see, e.g., column 11, line 58 through column 12, line 13); Hayes U.S. Pat. No. 4,717,394 (see, e.g., column 4, line 64 through column 5, line 2); Hoehn et al U.S. Pat. Reissue No. 30,351 (see, e.g., column 4, lines 55–56).

EXAMPLES

Before reporting on the experiments below, we provide some needed terminology.

When a gas species passes through a membrane, the flow rate Q is proportional to the area A of the membrane, and the pressure difference $\Delta p$ across the membrane, but reciprocally proportional to the thickness L of the membrane. That is, $$Q = (P \cdot A \cdot \{p\})/L$$

where P is a characteristic of the membrane, the proportion constant named "permeability". The permeability P of the membrane varies with the gas species and the operation conditions such as temperature, pressure, and the gas composition if gas mixtures are used. The thickness L of the membrane usually is difficult to define or measure when the membrane is in asymmetric or ultrathin form, the latter of which is only a couple of hundred Å ("Å") to about 2,000 Å thick. Therefore, in practice, the ratio P/L of permeability to thickness, which is hereinafter called "permeance" is used as a measure of the performance of the membrane. That is, according to the previous equation, $$P/L = \frac{Q}{A \cdot \Delta p}$$

where Q, A and $\Delta p$ are easily measurable. In this formula the units we use are:
Q: [standard cubic feet per hour, or SCFH]
A: [ft$^2$]
$\Delta p$: [100 psi]
P/L: [SCFH/ft$^2$/100 psi]

The selectivity $\alpha$ of a membrane (also called separation factor) in separating two gas species A and B from each other is defined as the ratio of their gas permeances in that membrane. That is, $$\alpha_{(A/B)} = \frac{(P/L)_A}{(P/L)_B}$$

The selectivity $\alpha(A/B)$ can be obtained by measuring the gas permeance of each gas in pure gas state or in mixed gas state. The selectivity is a measure of how well the membrane can separate the gases while the permeance is a measure of how fast the membrane can let the gases pass through. In most applications, the membrane is made to maximize both permeance and selectivity.

In the Examples below, the following materials are used:

TABLE 1

| DESIGNATION | Organopolysiloxane Prepolymers ORGANOPOLYSILOXANE COMPOSITION |
|---|---|
| PS - 783 | (84%)dimethylsiloxane; (16%)diphenylsiloxane; vinyl-terminated |
| PS - 793 | (76.5%)dimethylsiloxane; (23.5%)diphenylsiloxane; vinyl-terminated |

In Table 1 above, the organopolysiloxane prepolymers are listed according to the relative weight percentages taken up by the various components. For example, PS-783 is a mixture of 84% dimethylsiloxane (by weight) with 16% diphenylsiloxane (by weight); the prepolymers are vinyl-terminated.

TABLE 2

| DESIGNATION | Organopolysiloxane Crosslinkers ORGANOPOLYSILOXANE COMPOSITION |
|---|---|
| PS - 122 | polymethylhydrosiloxane, trimethylsilyl-terminated |
| PS - 123 | (30–35%)methylhydrosiloxane; (70–65%)dimethylsiloxane, trimethylsilyl-terminated |

In Table 2 above, the organopolysiloxane crosslinkers are listed according to the relative weight percentages taken up by the various components. For example, PS-123 is a mixture of 30–35% (by weight) methylhydrosilioxane with 70–65% (by weight) dimethylsiloxane.

TABLE 3

| DESIGNATION | 6FDA - polyimides DESCRIPTION |
|---|---|
| 50NDA | 50%, 1,5-naphthalenediamine; 50% 1,3-diaminobenzene |
| 25BA | 25% 3,5-diaminobenzoic acid; 75% 1,3-diaminobenzene |
| 50BA | 50% 3,5-diaminobenzoic acid; 50% 1,3-diaminobenzene |

In Table 3 above, 1:1 molar (stoichiometric) mixtures of 6FDA (5,5'-2,2,2-trifluoro-1-(trifluoromethyl)ethylidene-bis-1,3-isobenzofuranedione) with the given diamine molar (stoichiometric) mixture are indicated.

TABLE 4

| DESIGNATION | Solvents DESCRIPTION |
|---|---|
| ACE | Acetone |
| DOL | 1,3-dioxolane |
| MECL2 | 1,2-dichloromethane (also called methylene chloride) |
| MEK | Methyl ethyl ketone |

TABLE 5

| DESIGNATION | Other Materials DESCRIPTION |
|---|---|
| MA-ST | organosilica-sol[1] |
| PC072 | platinum catalyst[2] |

[1] A grade designation for an organosilica-sol dispersion commercially available from Nissan Chemical Industries, Ltd. The MA-ST grade is 30 weight % silicon dioxide (silica-sol) dispersed in 70 weight % methanol. The sol particle size is 0.01 micron; the pH is 3-5; and the viscosity is 1-5 centipoise at 25° C.

[2] A grade designation for a platinum divinyl complex used as a catalyst for crosslinking the organopolysiloxane prepolymers; it contains 2-3% by weight particulate platinum dispersed in xylene.

EXAMPLES 1-6

The materials and results for these EXAMPLES are summarized in TABLE 6.

Porous PAN Structural Support Preparation

The polymer used to cast the structural support was a copolymer of acrylonitrile and methyl acrylate made by DuPont and sold under the name Polymeric Acrylonitrile Type A-7, referred to as polyacrylonitrile or PAN hereinafter. A PAN solution was prepared by dissolving 16% by weight of polyacrylonitrile and 10% by weight of PEG 600 (a polyethylene glycol having a weight average molecular weight of about 570 to about 630, sold by Fisher Scientific, which was used to enhance the PAN porosity) in 74% by weight of 1-methyl-2-pyrrolidinone (NMP) at about 70° to 80° C. The polyacrylonitrile solution was coated onto a HOLLYTEX polyester support cloth, and the coated cloth was dipped into a water bath at ambient temperature to release both the PEG 600 and the NMP. The PAN structural support was then further rinsed in a water bath at 65° to 75° C. to remove residual PEG 600 and NMP. The porous PAN structural support was then dried in an air blowing tunnel at about 50° C.

Organopolysiloxane Gutter Layer Preparation

Organopolysiloxane prepolymers were prepared as follows. Before coating the siloxane prepolymer on the PAN structural support, it was pre-cured to minimize penetration of siloxane prepolymer molecules and oligomers into the surface pores of the PAN support.

Pre-Cured siloxane solution A (hereinafter, Siloxane A)

The catalyst PC072 was diluted to a 10% solution by weight in acetone. A mixture of PS783 siloxane (4.0 grams), PS123 crosslinker (0.10 grams), acetone (12.0 grams), and the diluted PC072 (0.11 grams, 10% by weight PC072) was placed in a capped test tube and kept in an oven at 61° C. for four hours, with periodic manual tumbling at approximately 20 minute intervals. The resulting pre-cured siloxane polymer solution was then poured into a cup containing 84 grams of acetone to dilute the pre-cured PS783 to a 4% solution by weight (4.0 grams in 100 grams total solution). A second aliquot of PS123 crosslinker (0.10 grams) was then added to the 100 gram solution to facilitate post-curing as described later below.

Pre-Cured Siloxane Solution B (hereinafter, Siloxane B)

Siloxane B was prepared by adding 4.0 grams of MA-ST silica-sol (30% by weight silica-sol and 70% by weight methanol) into 100 grams of pre-cured PS783 prepared as for Siloxane A (4% solution in acetone). The neat amount of the silica-sol (4.0 grams × 30% = 1.2 grams) relative to that of PS783 (4.0 grams) in the solution is 30% (1.2 ÷ 4 = 0.30).

Pre-Cured Siloxane Solution C (hereinafter, Siloxane C)

Siloxane C was prepared by adding 6.7 grams of MA-ST silica-sol (30% by weight silica-sol and 70% by weight methanol) into 100 grams of pre-cured PS783 prepared as for Siloxane A (4% solution in acetone). The neat amount of the silica-sol (6.7 grams × 30% = 2.0 grams) relative to that of PS783 (4.0 grams) in the solution is 50% (2 ÷ 4 = 0.50).

Coating of the Silicon Solution to Form the Gutter Layer

Each of the Siloxanes A-C was separately coated onto a PAN porous structural support by a meniscus coating process. The solvents were allowed to evaporate in ambient air, and then the composite (siloxane on PAN structural support) was post-cured in an oven at about 60° to 65° C. for 1-2 hours to completely cure the siloxane.

Coating of the 6FDA-Polyimide to Form the Selective Membrane Layer

The 6FDA-polyimide employed in EXAMPLES 1-6 was a copolymer of 6FDA and a diamine mixture. The diamine mixture contained 50% (mole fraction) 1,3-diaminobenzene and 50% (mole fraction) 1,5-naphthalenediamine. The 6FDA and diamine mixture were combined, diluted to a 20% by weight solution in N,N-dimethylacetamide and allowed to react for 24 hours at ambient temperature. The resulting polyamide was then dehydrated by reaction with a stoichiometric excess of acetic anhydride in the presence of pyridine (the latter serving as the reaction initiator) at about 80° to 90° C. for one hour to yield the desired 6FDA-polyimide. The product polyimide solution was then slowly poured into methanol to precipitate the polyimide out from the solvents in a fine fiber form. The resultant polyimide fibers were then thoroughly rinsed with methanol and dried in a vacuum oven at 100° C. for 24 hours. The recovered 6FDA-polyimide (hereinafter "50NDA") was then dissolved in acetone (1% 50NDA by weight) and coated onto the siloxane surface of the composite by a meniscus coating process. The relative humidity in the atmosphere during these operations was 29%, and the surface of the composite was blown with nitrogen to keep moisture away. After the acetone evaporated into the ambient air, the composite (PAN+siloxane+6-FDA-polyimide) was dried in an oven at 60° to 65° C. for one hour.

Gas Transport Performance of the Composite Membranes

The gas permeance and selected separation factors for the composite membranes were measured at ambient temperature using pure gases. The feed-side pressure was 100 psig (pounds per square inch gauge) for helium, methane and nitrogen; and 10 psig for carbon dioxide. The permeate-side pressure was atmospheric pressure for all gases. Table 1-6 summarizes the gas permeance and separation factors for EXAMPLES 1-6. In EXAMPLES 1-3, the membranes were not coated with a 6FDA-polyimide layer; they therefore demonstrated much higher gas permeance but lower separation factors than their counterparts with the 6FDA-polyimide selective membrane layer, EXAMPLES 4-6. The addition of the MA-ST silica-sol improved the coating of the 6FDA-polyimide layer on the siloxane layer. This is confirmed by the improved separation factors in EXAMPLES 5-6 as compared with EXAMPLE 4.

TABLE 6

| | EXAMPLES 1-6 | | PERMEANCE[1] | | | | SEPARATION FACTOR[2] | | |
|---|---|---|---|---|---|---|---|---|---|
| No | GUTTER LAYER | 6FDA - POLYIMIDE | $N_2$ | $CH_4$ | $CO_2$ | He | $N_2/CH_4$ | $CO_2/CH_4$ | $He/CH_4$ |
| 1 | Siloxane A; (no MA-ST) | NONE | 2.86 | 9.14 | 41.3 | 4.78 | 0.31 | 4.52 | 0.52 |
| 2 | Siloxane B; (30% MA-ST) | NONE | 2.63 | 8.10 | 35.9 | 4.52 | 0.32 | 4.43 | 0.56 |
| 3 | Siloxane C; (50% MA-ST) | NONE | 2.70 | 7.68 | 32.4 | 4.84 | 0.35 | 4.23 | 0.63 |
| 4 | Siloxane A; (no MA-ST) | 1% 50NDA dissolved in acetone | 0.388 | 0.268 | 11.6 | 4.63 | 1.47 | 44.3 | 17.8 |
| 5 | Siloxane B; (30% MA-ST) | 1% 50NDA dissolved in acetone | 0.198 | 0.094 | 7.73 | 3.32 | 2.11 | 83.2 | 36.1 |
| 6 | Siloxane C; (50% MA-ST) | 1% 50NDA dissolved in acetone | 0.195 | 0.087 | 7.59 | 2.88 | 2.25 | 87.5 | 33.9 |

[1]Permeance is expressed in standard cubic feet per hour per square foot at a pressure of 100 pounds per square inch. ($N_2$ = nitrogen; $CH_4$ = methane; $CO_2$ = carbon dioxide; and He = helium).
[2]Separation factor is expressed as the ratio of permeance values for each gas pair.

EXAMPLES 7–14

The materials and results for these EXAMPLES are summarized in TABLE 7. These EXAMPLES demonstrate the effects of adding more cross-linker and/or prolonging the post-curing time on the performance of the composite membrane.

Porous PAN Structural Support Preparation

The preparation of the porous PAN structural support was carried out in the same manner as in EXAMPLES 1-6.

Organopolysiloxane Gutter Layer Preparation

Organopolysiloxane prepolymers were prepared as follows. Before coating the siloxane prepolymer on the PAN structural support, it was pre-cured to minimize penetration of siloxane prepolymer molecules and oligomers into the surface pores of the PAN support.

Pre-Cured Siloxane Solution D (hereinafter, Siloxane D)

The catalyst PC072 was diluted to a 10% solution by weight in acetone. A mixture of PS793 siloxane (3.4 grams), PS123 crosslinker (0.10 grams), acetone (6.4 grams), and the diluted PC072 (0.10 grams, 10% by weight PC072) was placed in a capped test tube and kept in an oven at 61° C. for 40 minutes with periodic manual tumbling. The resulting pre-cured siloxane polymer solution was then poured into a cup containing 75 grams of acetone to dilute the pre-cured PS793 to a 4% solution by weight (3.4 grams in about 85 grams total solution). To this solution, 3.4 grams of MA-ST silica-sol were then added. The neat amount of the silica-sol (3.4 grams ×30%=1.02 grams) relative to that of PS793 (3.4 grams) in the solution is 30% (1.02÷3.4=0.30). No additional PS123 crosslinker was added.

Pre-Cured Siloxane Solution E (hereinafter, Siloxane E)

Siloxane E was prepared in the same manner as was Siloxane D, except that a second aliquot of PS123 crosslinker (0.10 grams) was then added to the 85 gram solution to facilitate post-curing as described later below.

Pre-Cured Siloxane Solution F (hereinafter, Siloxane F)

Siloxane F was prepared in the same manner as was Siloxane D.

Pre-Cured siloxane Solution G (hereinafter, Siloxane G)

Siloxane G was prepared in the same manner as was Siloxane E.

Coating of the Silicon Solution to Form the Gutter Layer

Each of the Siloxanes D–G was separately coated onto a PAN porous structural support by a meniscus coating process. The solvents were allowed to evaporate in ambient air, and then the composite (siloxane on PAN structural support) was post-cured in an oven at about 60° to 65° C. In the cases of Siloxanes D and E, the post-curing time was 20 minutes; in the cases of Siloxanes F and G, the post-curing time was 2 hours.

Coating of the 6FDA-Polyimide to Form the Selective Membrane Layer

The coating of the 6FDA-polyimide onto the siloxane gutter layer was carried out, as indicated in TABLE 7, in the same manner as in EXAMPLES 1-6, except that the relative humidity was 32%.

Gas Transport Performance of the Composite Membranes

The gas permeance and selected separation factors for the composite membranes were measured at ambient temperature using pure gases. The feed-side pressure was 100 psig (pounds per square inch gauge) for helium, methane and nitrogen; and 10 psig for carbon dioxide. The permeate-side pressure was atmospheric pressure for all gases. Table 7 summarizes the gas permeance and separation factors for EXAMPLES 7-14. For EXAMPLES 7-10, the carbon dioxide permeance and the carbon dioxide/methane separation factors are nearly the same. In the comparable examples having 6FDA-polyimide layers added, however, the results vary. The membranes in EXAMPLES 11 and 12 show both lower carbon dioxide permeance and lower carbon dioxide/methane separation factors than the membranes in EXAMPLES 13 and 14. This is because the gutter layers in EXAMPLES and 12 were not completely post-cured, allowing migration of the siloxane into the 6FDA-polyimide layer. The incomplete post-curing was due inadequacy in either curing time or cross-linker concentration. On the other hand, the good separation factors in EXAMPLES 13-14 indicate that the corresponding siloxane gutter layers were well post-cured.

gram solution to facilitate post-curing as described later below. To this solution then were added 4.06 grams of MA-ST silica-sol (30% by weight silica-sol and 70% by weight methanol). The neat amount of the silica-sol

TABLE 7

| No | EXAMPLES 7-14 GUTTER LAYER | 6FDA - POLYIMIDE | PERMEANCE[1] $N_2$ | $CH_4$ | $CO_2$ | He | SEPARATION FACTOR[2] $N_2/CH_4$ | $CO_2/CH_4$ | $He/CH_4$ |
|---|---|---|---|---|---|---|---|---|---|
| 7 | Siloxane D; 20 minute cure | NONE | 1.95 | 5.01 | 21.0 | 4.22 | 0.39 | 4.20 | 0.84 |
| 8 | Siloxane E; 20 minute cure; double crosslinker | NONE | 1.26 | 3.86 | 18.9 | 2.53 | 0.33 | 4.89 | 0.65 |
| 9 | Siloxane F; 2 hour cure | NONE | 1.42 | 4.36 | 21.3 | 2.90 | 0.33 | 4.89 | 0.66 |
| 10 | Siloxane G; 2 hour cure; double crosslinker | NONE | 1.22 | 3.77 | 18.6 | 2.50 | 0.32 | 4.94 | 0.67 |
| 11 | Siloxane D; 20 minute cure | 1% 50NDA dissolved in acetone | 0.58 | 0.49 | 5.61 | 2.77 | 1.19 | 11.8 | 5.81 |
| 12 | Siloxane E; 20 minute cure; double crosslinker | 1% 50NDA dissolved in acetone | 0.206 | 0.108 | 5.90 | 2.06 | 1.91 | 54.9 | 19.2 |
| 13 | Siloxane F; 2 hour cure | 1% 50NDA dissolved in acetone | 0.193 | 0.088 | 7.03 | 2.21 | 2.19 | 79.8 | 25.1 |
| 14 | Siloxane G; 2 hour cure; double crosslinker | 1% 50NDA dissolved in acetone | 0.189 | 0.089 | 7.09 | 2.14 | 2.13 | 80.0 | 24.3 |

[1] Permeance is expressed in standard cubic feet per hour per square foot at a pressure of 100 pounds per square inch. ($N_2$ = nitrogen; $CH_4$ = methane; $CO_2$ = carbon dioxide; and He = helium).
[2] Separation factor is expressed as the ratio of permeance values for each gas pair.

EXAMPLES 15-16

The materials and results for these EXAMPLES are summarized in TABLE 8. These Examples demonstrate the effect of using PS-122 crosslinker instead of PS-123 as was used in Examples 1-14. Also, a different 6FDA-polyimide selective membrane layer was prepared in EXAMPLE 16.

Porous PAN Structural Support Preparation

The preparation of the porous PAN structural support was carried out in the same manner as in EXAMPLES 1-6.

Organopolysiloxane Gutter Layer Preparation

Organopolysiloxane prepolymers were prepared as follows. Before coating the siloxane prepolymer on the PAN structural support, it was pre-cured to minimize penetration of siloxane prepolymer molecules and oligomers into the surface pores of the PAN support.

Pre-Cured siloxane Solution H (hereinafter, Siloxane H)

The catalyst PC072 was diluted to a 5% solution by weight in acetone. A mixture of PS783 siloxane (4.06 grams), PS122 crosslinker (0.60 grams, diluted to 10% by weight in acetone), acetone (10.38 grams), and the diluted PC072 (0.20 grams, 5% by weight PC072) was placed in a capped test tube and kept at ambient temperature with constant tumbling for 15 minutes. Compared with EXAMPLES 1-14, the pre-curing here was possible at a much lower temperature and for a shorter period of time. This was due to the use of PS-122 instead of PS-123: the PS-122 crosslinker contains 100% methylhydrosiloxane, which is the active crosslinking moiety. The resulting pre-cured siloxane polymer solution was then poured into a cup containing 120 grams of acetone to dilute the pre-cured PS783 to a 3% solution by weight (4.06 grams in 135 grams total solution). A second aliquot of PS122 crosslinker (0.50 grams diluted to 10% by weight in acetone) was then added to the 135 gram solution to facilitate post-curing as described later below. To this solution then were added 4.06 grams of MA-ST silica-sol (30% by weight silica-sol and 70% by weight methanol). The neat amount of the silica-sol (4.06 grams × 30% = 1.22 grams) relative to that of PS783 (4.06 grams) in the solution is 30% (1.22 ÷ 4.06 = 0.30).

Coating of the Silicon Solution to Form the Gutter Layer

The Siloxane H was then coated onto a PAN porous structural support by a meniscus coating process. The solvents were allowed to evaporate in ambient air, and then the composite (siloxane on PAN structural support) was post-cured in an oven at about 60° to 65° C. for 3 hours to completely cure the siloxane.

Coating of the 6FDA-Polyimide to Form the Selective Membrane Layer

The 6FDA-polyimide employed in EXAMPLES 15-16 was a copolymer of 6FDA and a diamine mixture. The diamine mixture contained 50% (mole fraction) 1,3-diaminobenzene and 50% (mole fraction) 3,5-diaminobenzoic acid. The 6FDA and diamine mixture were combined, diluted to a 20% by weight solution in N,N-dimethylacetamide and allowed to react for 24 hours at ambient temperature. The resulting polyamide was then dehydrated by reaction with a stoichiometric excess of acetic anhydride in the presence of pyridine (the latter serving as the reaction initiator) at about 80° to 90° C. for one hour to yield the desired 6FDA-polyimide. The product polyimide solution was then slowly poured into methanol to precipitate the polyimide out from the solvents in a fine fiber form. The resultant polyimide fibers were then thoroughly rinsed with methanol and dried in a vacuum oven at 100° C. for 24 hours. The recovered 6FDA-polyimide (hereinafter "50BA") was then dissolved in a solvent mixture containing 50% by weight of acetone and 50% by weight of methyl ethyl ketone (2% 50BA by weight) and coated onto the siloxane surface of the composite by a meniscus coating process. The relative humidity in the atmosphere during these operations was about 25 to 30%.

After the acetone evaporated into the ambient air, the composite (PAN+siloxane+6FDA-polyimide) was dried in an oven at 60° C. for one hour.

Gas Transport Performance of the Composite Membranes

The gas permeance and selected separation factors for the composite membranes were measured at ambient temperature using pure gases. The feed-side pressure was 100 psig (pounds per square inch gauge) for helium, methane and nitrogen; and 10 psig for carbon dioxide. The permeate-side pressure was atmospheric pressure for all gases. Table 8 summarizes the gas permeance and separation factors for EXAMPLES 15-16. Compared with Examples 13-14, Example 16 yielded an equally good $CO_2/CH_4$ separation factor, and a much better $He/CH_4$ separation factor.

Pre-Cured siloxane solution J (hereinafter, siloxane J)

Siloxane J was prepared by adding 4.0 grams of MA-ST silica-sol (30% by weight silica-sol and 70% by weight methanol) into 135 grams of pre-cured PS783 prepared as for Siloxane I (3% solution in acetone). The neat amount of the silica-sol (4.0 grams×30%=1.2 grams) relative to that of PS783 (4.0 grams) in the solution is 30% (1.2÷40.30).

Coating of the Silicon Solution to Form the Gutter Layer

Each of the Siloxanes I and J was separately coated onto a PAN porous structural support by a meniscus coating process. The solvents were allowed to evaporate in ambient air, and then the composite (siloxane on PAN structural support) was post-cured in an oven at

TABLE 8

| | EXAMPLES 15-16 | PERMEANCE[1] | | | | SEPARATION FACTOR[2] | | |
|---|---|---|---|---|---|---|---|---|
| No | GUTTER LAYER | 6FDA - POLYIMIDE | $N_2$ | $CH_4$ | $CO_2$ | He | $N_2/CH_4$ | $CO_2/CH_4$ | $He/CH_4$ |
| 15 | Siloxane H; 30% MA-ST | NONE | 2.44 | 7.92 | 38.5 | 4.33 | 0.31 | 4.86 | 0.55 |
| 16 | Siloxane H; 30% MA-ST | 2% solution of 50BA dissolved in 1:1 (weight/weight) ACE/MEK | 0.17 | 0.0635 | 5.22 | 2.96 | 2.68 | 82.2 | 46.6 |

[1]Permeance is expressed in standard cubic feet per hour per square foot at a pressure of 100 pounds per square inch. ($N_2$ = nitrogen; $CH_4$ = methane; $CO_2$ = carbon dioxide; and He = helium).
[2]Separation factor is expressed as the ratio of permeance values for each gas pair.

EXAMPLES 17-23

The materials and results for these EXAMPLES are summarized in TABLE 9. These EXAMPLES demonstrate the effects of varying solvent systems used to dissolve the 6FDA-polyimides.

Porous PAN Structural Support Preparation

The preparation of the porous PAN structural support was carried out in the same manner as in EXAMPLES 1-6.

Organopolysiloxane Gutter Layer Preparation

Organopolysiloxane prepolymers were prepared as follows. Before coating the siloxane prepolymer on the PAN structural support, it was pre-cured to minimize penetration of siloxane prepolymer molecules and oligomers into the surface pores of the PAN support.

Pre-Cured Siloxane solution I (hereinafter, Siloxane I)

The catalyst PC072 was diluted to a 10% solution by weight in acetone. A mixture of PS783 siloxane (4 0 grams), PS122 crosslinker (0.50 grams diluted to 10% by weight in acetone), acetone (10.0 grams), and the diluted PC072 (0.10 grams, 10% by weight PC072) was placed in a capped test tube and kept at ambient temperature with constant tumbling for 30 minutes. The resulting pre-cured siloxane polymer solution was then poured into a cup containing 120 grams of acetone to dilute the pre-cured PS783 to a 3% solution by weight (4.0 grams in about 135 grams total solution). A second aliquot of PS122 crosslinker (0.60 grams diluted to 10% by weight in acetone) was then added to the 135 gram solution to facilitate post-curing as described later below.

about 60° C. for 1-2 hours to completely cure the siloxane.

Coating of the 6FDA-Polyimide to Form the Selective Membrane Layer

Two different 6FDA-polyimides were used in EXAMPLES 17-23. One of these, 50NDA (and its preparation) was described above in EXAMPLES 4-6. The other, hereinafter "25BA", was a copolymer of 6FDA and a different diamine mixture. The diamine mixture contained 75% (mole fraction) 1,3-diaminobenzene and 25% (mole fraction) 3,5-diaminobenzoic acid. To prepare the 25BA, the 6FDA and diamine mixture were combined, diluted to a 20% by weight solution in N,N-dimethylacetamide and allowed to react for 24 hours at ambient temperature. The resulting polyamide was then dehydrated by reaction with a stoichiometric excess of acetic anhydride in the presence of pyridine (the latter serving as the reaction initiator) at about 80° to 90° C. for one hour to yield the desired 6FDA-polyimide. The product polyimide solution was then slowly poured into methanol to precipitate the polyimide out from the solvents in a fine fiber form. The resultant polyimide fibers were then thoroughly rinsed with methanol and dried in a vacuum oven at 100° C. for 24 hours. The recovered 6FDA-polyimides indicated below in TABLE 9 were then dissolved in the indicated solvent systems and coated onto the siloxane surface of the composite by a meniscus coating process. The relative humidity in the atmosphere during these operations was about 25-30%. After the solvents evaporated into the ambient air, the composite (PAN+siloxane+6FDA-polyimide) was dried in an oven at about 60°-65° C. for one hour.

Gas Transport Performance of the Composite Membranes

The gas permeance and selected separation factors for the composite membranes were measured at ambient temperature using pure gases. The feed-side pressure was 100 psig (pounds per square inch gauge) for helium, methane and nitrogen; and 10 psig for carbon dioxide. The permeate-side pressure was atmospheric pressure for all gases. Table 9 summarizes the gas permeance and separation factors for EXAMPLES 17-23. Comparing EXAMPLES 22 and 19, the carbon dioxide/methane separation factor is greatly improved in the former by the addition of a silica-sol to the gutter layer.

capped test tube and kept at ambient temperature with constant tumbling for eight minutes. As compared with previous EXAMPLES, the use of methylene chloride significantly shortens the pre-curing time (being very hygroscopic, the methylene chloride segregates water, thus preventing it from poisoning the catalyst, having the effect of accelerating the reaction). This can be an advantage in terms of saving time but can also be a disadvantage because the crosslinking reaction may be too fast to control (gelation may occur before the coating process can be completed). The resulting pre-cured siloxane polymer solution was then poured into a cup containing 175 grams of methylene chloride to dilute the pre-cured PS783 to a 2% solution by weight (4.0

TABLE 9

| | EXAMPLES 17-23 | | PERMEANCE[1] | | | SEPARATION FACTOR[2] | | |
|---|---|---|---|---|---|---|---|---|
| | | | | | | $N_2$/ | $CO_2$/ | He/ |
| No | GUTTER LAYER | 6FDA - POLYIMIDE | $N_2$ | $CH_4$ | $CO_2$ | He | $CH_4$ | $CH_4$ | $CH_4$ |
| 17 | Siloxane I | NONE | 2.49 | 7.57 | 36.1 | N/A[3] | 0.33 | 4.77 | N/A |
| 18 | Siloxane I | 1.5% solution of 50NDA dissolved in 1:1 (weight/weight) ACE/MEK | 0.166 | 0.0651 | 6.97 | N/A | 2.55 | 107 | N/A |
| 19 | Siloxane I | 1.5% solution of 50NDA dissolved in 4:1 (weight/weight) ACE/DOL | 0.126 | 0.0555 | 5.94 | 3.37 | 2.27 | 107 | 61 |
| 20 | Siloxane I | 1.5% solution of 25BA dissolved in 1:1 (weight/weight) ACE/MEK | 0.108 | 0.0445 | 5.43 | N/A | 2.43 | 122 | N/A |
| 21 | Siloxane I | 1.5% solution of 25BA dissolved in MEK | 0.13 | 0.0629 | 5.07 | N/A | 2.07 | 81 | N/A |
| 22 | Siloxane J; 30% MA-ST | 1.5% solution of 50NDA dissolved in 4:1 (weight/weight) ACE/DOL | 0.114 | 0.0391 | 5.85 | 2.61 | 2.92 | 150 | 67 |
| 23 | Siloxane J; 30% MA-ST | 1.5% solution of 50NDA dissolved in 12:2:1 (weight/weight/weight) ACE/DOL/MEK | 0.138 | 0.0492 | 5.68 | 2.63 | 2.80 | 116 | 54 |

[1]Permeance is expressed in standard cubic feet per hour per square foot at a pressure of 100 pounds per square inch. ($N_2$ = nitrogen; $CH_4$ = methane; $CO_2$ = carbon dioxide; and He = helium).
[2]Separation factor is expressed as the ratio of permeance values for each gas pair.
[3]N/A = data not measured.

EXAMPLES 24-27

The materials and results for these EXAMPLES are summarized in TABLE 10. These EXAMPLES demonstrate the effect of substituting methylene chloride for acetone as the solvent for the siloxane prepolymer PS-783, the crosslinker PS-122, and the catalyst PC072.

Porous PAN Structural Support Preparation

The preparation of the porous PAN structural support was carried out in the same manner as in EXAMPLES 1-6.

Organopolysiloxane Gutter Layer Preparation

Organopolysiloxane prepolymers were prepared as follows. Before coating the siloxane prepolymer on the PAN structural support, it was pre-cured to minimize penetration of siloxane prepolymer molecules and oligomers into the surface pores of the PAN support.

Pre-cured siloxane solution K (hereinafter, siloxane K)

The catalyst PC072 was diluted to a 10% solution by weight in methylene chloride. A mixture of PS783 siloxane (4.0 grams), PS122 crosslinker (0.52 grams, diluted to 10% by weight with methylene chloride), methylene chloride (20.0 grams), and the diluted PC072 (0.10 grams, 10% by weight PC072) was placed in a grams in 200 grams total solution). Even though the concentration of PS-783 used here, 2% by weight, is lower than that used in previous EXAMPLES (3% or 4% by weight), the volume concentration is nearly the same. This is because methylene chloride has a density of 1.34, which is about 1.7 times greater than that of acetone, which is 0.79. A second aliquot of PS122 crosslinker (0.52 grams diluted to 10% by weight in methylene chloride) was then added to the 200 gram solution to facilitate post-curing as described later below.

Coating of the Silicon Solution to Form the Gutter Layer

Siloxane K was coated onto a PAN porous structural support by a meniscus coating process. The solvent was allowed to evaporate in ambient air, and then the composite (siloxane on PAN structural support) was post-cured in an oven at about 60° C. for 1-2 hours to completely cure the siloxane.

Coating of the 6FDA-Polyimide to Form the Selective Membrane Layer

The two 6FDA-polyimides which were used in EXAMPLES 24-27 are the same as the ones used in EXAMPLES 17-23. The 6FDA-polyimides were dissolved in a mixture of acetone and methyl ethyl ketone in 1:1 ratio by weight and coated onto the siloxane that there were no effects in the 6FDA-polyimide selective membrane layer.

TABLE 10

| No | EXAMPLES 24-27 | | | PERMEANCE[1] | | | | SEPARATION FACTOR[2] | | |
|---|---|---|---|---|---|---|---|---|---|---|
| | GUTTER LAYER | 6FDA-POLYIMIDE | PROTECT-IVE LAYER | $N_2$ | $CH_4$ | $CO_2$ | He | $N_2/CH_4$ | $CO_2/CH_4$ | $He/CH_4$ |
| 24 | SILICONE K | 2% solution of 50NDA dissolved in 1:1 (weight/weight) ACE/MEK | NONE | 0.0868 | 0.0261 | 3.22 | 2.84 | 3.33 | 123 | 109.0 |
| 25 | SILICONE K | 2% solution of 50NDA dissolved in 1:1 (weight/weight) ACE/MEK | 4% SLYGARD ® 186 | 0.081 | 0.0255 | 3.05 | 2.51 | 3.18 | 120 | 98.0 |
| 26 | SILICONE K | 1.5% solution of 25BA dissolved in 1:1 (weight/weight) ACE/MEK | NONE | 0.0991 | 0.0333 | 4.63 | 3.35 | 2.98 | 139 | 101.0 |
| 27 | SILICONE K | 1.5% solution of 25BA dissolved in 1:1 (weight/weight) ACE/MEK | 4% SLYGARD ® 186 | 0.0911 | 0.0266 | 3.98 | 2.90 | 3.42 | 150 | 109.0 |

[1]Permeance is expressed in standard cubic feet per hour per square foot at a pressure of 100 pounds per square inch. ($N_2$ = nitrogen; $CH_4$ = methane; $CO_2$ = carbon dioxide; and He = helium).
[2]Separation factor is expressed as the ratio of permeance values for each gas pair.

surface of the composite by a meniscus coating process. The relative humidity in the atmosphere during these operations was about 25–30%. After the solvent evaporated into the ambient air, the composite (PAN+siloxane+6FDA-polyimide) was dried in an oven at 60°–65° C. for one hour.

Coating of a Protective Layer

In EXAMPLES 25 and 27, a silicone protective layer was coated onto the 6FDA-polyimide selective membrane layer. This layer was added to protect the 6FDA-polyimide layer from being scratched or otherwise damaged during handling and use of the composite membrane. As indicated in TABLE 10, addition of the protective layer had little effect on the overall membrane gas permeance performance. The silicone employed was SYLGARD ® 186 which is a room-temperature-curing polysiloxane elastomer supplied as a two-component system (the siloxane resin and its curing agent) by Dow Corning. A solution consisting of 4.0 grams of SYLGARD ® 186 resin, 0.4 grams SYLGARD ® 186 curing agent, and 95.6 grams of hexane was coated onto the 6FDA-polyimide surface of the composite by a meniscus coating process. The hexane was allowed to evaporate in the ambient air and the membrane was cured in an oven at 60° to 65° C. for one hour.

Gas Transport Performance of the Composite Membranes

The gas permeance and selected separation factors for the composite membranes were measured at ambient temperature using pure gases. The feed-side pressure was 100 psig (pounds per square inch gauge) for helium, methane and nitrogen; and 10 psig for carbon dioxide. The permeate-side pressure was atmospheric pressure for all gases. Table 10 summarizes the gas permeance and separation factors for EXAMPLES 24-27. Comparing EXAMPLE 25 with EXAMPLE 24, the membrane separation factor was not changed (improved) by the addition of the silicone protective layer, indicating that there were no effects in the 6FDA-polyimide selective membrane layer.

While several embodiments of the invention have been illustrated and described above, it is not intended to be limited to the details shown, since various modifications and structural changes may be made without departing from the spirit of the present invention, which is defined by the claims below. For example, it is possible that the improved gutter layers of the invention having increased surface tension, will allow the subsequent deposition of selective membrane layers made from polymers other than 6FDA-type polyimides, such as polycarbonates, polyesters and cellulose acetate. While ultrathin selective membrane layers are normally preferred, thicker ones can be used if necessary in particular circumstances.

What is claimed as new and desired to be protected by Letters Patent is set forth in the appended claims:

1. A composite gas separation membrane comprising:
   (A) a porous polyacrylonitrile structural support material having a polyacrylonitrile surface;
   (B) a gutter layer coating comprising a crosslinked polar phenyl-containing-organopolysiloxane material on the polyacrylonitrile surface of the structural support material, leaving an uncoated gutter layer surface; and
   (C) an ultrathin 6FDA-type polyimide selective membrane layer coating on the uncoated gutter layer surface.

2. The composite gas separation membrane of claim 1 in which the phenyl-containing-organopolysiloxane is a diphenyl-dimethylsiloxane co-prepolymer.

3. The composite gas separation membrane of claim 1 or 2 in which the phenyl-containing-organopolysiloxane has vinylated end groups.

4. The composite gas separation membrane of claim 1 in which about 10–30% of the available silicon sites on the phenyl-containing-organopolysiloxane are diphenyl-substituted.

5. The composite gas separation membrane of claim i in which the phenyl-containing-organopolysiloxane material comprises an effective amount of a silica-sol.

6. The composite gas separation membrane of claim 5 in which the phenyl-containing-organopolysiloxane material comprises said silica-sol in an amount constituting about 25–75% by weight as compared with the weight of the phenyl-containing-organopolysiloxane (and excluding the weight of all solvents).

7. The composite gas separation membrane of claim 6 in which the phenyl-containing-organopolysiloxane comprises said silica-sol in an amount constituting about 30–50% by weight as compared with the weight of the phenyl-containing-organopolysiloxane (and excluding the weight of all solvents).

8. The composite gas separation membrane of claim 5, 6 or 7 in which the surface tension of the gutter layer coating comprising phenyl-containing-organopolysiloxane and silica-sol (and excluding the weight of all solvents) is about 25–30 dyne/centimeter.

9. The composite gas separation membrane of claim 1 in which the 6FDA-type polyimide is derived from the condensation of 5,5',-2,2,2-trifluoro-1-(trifluoromethyl)ethylidene-bis-1,3-isobenzofuranedione with an aromatic diamine.

10. The composite gas separation membrane of claim 9 in which the aromatic diamine is selected from the group consisting of: 1,3-diaminobenzene, 1,5-naphthalenediamine, 3,5-diaminobenzoic acid and mixtures.

11. The composite gas separation membrane of claim 1 in which the porous polyacrylonitrile structural support material has a form selected from the group consisting of flat sheet, hollow fiber or tubular.

12. A process for making a composite gas separation membrane comprising the following steps:
   (A) Providing a porous polyacrylonitrile structural support material having first and second surfaces, said first surface being a polyacrylonitrile surface;
   (B) Preparing a mixture comprising a polar phenyl-containing-organopolysiloxane, a crosslinker and a crosslinking catalyst;
   (C) Allowing the mixture to pre-cure but remain in an ungelled state;
   (D) Coating said first surface with said mixture and allowing said mixture to crosslink, constituting a gutter layer on the porous polyacrylonitrile structural support material, and leaving an uncoated gutter layer surface; and
   (E) Coating said uncoated gutter layer surface with an ultrathin 6FDA-type polyimide selective membrane layer, leaving an uncoated 6FDA-type polyimide selective membrane surface.

13. The process of claim 12, in which the phenyl-containing-organopolysiloxane is a diphenyl-dimethylsiloxane co-prepolymer.

14. The process of claim 12, in which the phenyl-containing-organopolysiloxane has vinylated end groups.

15. The process of claim 12 in which about 10–30% of the available silicon sites on the phenyl-containing-organopolysiloxane are diphenyl-substituted.

16. The process of claim 12 in which the phenyl-containing-organopolysiloxane material comprises an effective amount of a silica-sol.

17. The process of claim 16 in which the phenyl-containing-organopolysiloxane material comprises said silica-sol in an amount constituting about 25–75% by weight as compared with the weight of the phenyl-containing-organopolysiloxane (excluding the weight of all solvents).

18. The process of claim 17 in which the phenyl-containing -organopolysiloxane material comprises said silica-sol in an amount constituting about 30–50% by weight as compared with the weight of the phenyl-containing-organopolysiloxane (excluding the weight of all solvents).

19. The process of claim 16, 17 or 18 in which the surface tension of the gutter layer comprising phenyl-containing-organopolysiloxane and silica-sol is about 25–30 dyne/centimeter (excluding the weight of all solvents).

20. The process of claim 12 in which the 6FDA-type polyimide is derived from the condensation of 5,5'-2,2,2-trifluoro-1-(trifluoromethyl)ethylidene-bis-1,3-isobenzofuranedione with an aromatic diamine.

21. The process of claim 20 in which the aromatic diamine is selected from the group consisting of: 1,3-diaminobenzene, 1,5-naphthalenediamine, 3,5-diaminobenzoic acid and mixtures.

22. The process of claim 12 in which the porous polyacrylonitrile structural support material has a form selected from the group consisting of flat sheet, hollow fiber or tubular.

23. A gas separation process comprising the following steps:
   A. providing a gas separation membrane according to claim 1, 2, or 5 having feed and permeate sides;
   B. contacting the membrane with a mixed feed gas composition under pressure;
   C. collecting separated permeate gas from the permeate side of the membrane; and
   D. collecting retentate gas from the feed side of the membrane.

24. The process of claim 23, in which the mixed feed gas composition contains two or more members of the group consisting of methane, nitrogen, carbon dioxide and helium.

25. The process of claim 23, in which the mixed feed gas composition contains a mixture of gases selected from the group of mixtures consisting of: oxygen and air; nitrogen and air; hydrogen and hydrocarbon gas; carbon monoxide and hydrogen; carbon dioxide and hydrocarbons; hydrogen sulfide and hydrocarbons; and helium and nitrogen.

* * * * *